United States Patent [19]

Maejima et al.

[11] Patent Number: 4,523,276
[45] Date of Patent: Jun. 11, 1985

[54] INPUT/OUTPUT CONTROL DEVICE WITH MEMORY DEVICE FOR STORING VARIABLE-LENGTH DATA AND METHOD OF CONTROLLING THEREOF

[75] Inventors: Hideo Maejima; Ikuro Masuda; Hidekazu Matsumoto, all of Hitachi; Shyoichi Miyazawa, Narashino, all of Japan

[73] Assignee: Hitachi, Ltd., Tokyo, Japan

[21] Appl. No.: 533,803

[22] Filed: Sep. 19, 1983

Related U.S. Application Data

[63] Continuation of Ser. No. 194,226, Oct. 6, 1980, abandoned.

[30] Foreign Application Priority Data

Oct. 5, 1979 [JP] Japan .................. 54-127958

[51] Int. Cl.³ .............. G06F 5/00; G06F 13/00; G06F 15/16
[52] U.S. Cl. .................. 364/200; 340/347 DD
[58] Field of Search ... 364/200 MS File, 900 MS File; 340/347 DD

[56] References Cited

U.S. PATENT DOCUMENTS

| | | | |
|---|---|---|---|
| 4,103,329 | 7/1978 | Davis et al. | 364/200 |
| 4,103,334 | 7/1978 | Kashio | 364/900 |
| 4,109,310 | 8/1978 | England et al. | 364/200 |
| 4,115,768 | 9/1978 | Eggenberger et al. | 340/347 DD |
| 4,131,940 | 12/1978 | Moyer | 364/200 |
| 4,258,419 | 3/1981 | Blahut et al. | 364/200 |
| 4,271,480 | 6/1981 | Vindt | 364/200 |
| 4,282,584 | 8/1981 | Brown | 364/900 |
| 4,291,370 | 9/1981 | Charles | 364/200 |
| 4,301,505 | 11/1981 | Catiller | 364/200 |
| 4,309,754 | 1/1982 | Dinwiddie, Jr. | 364/200 |
| 4,314,332 | 2/1982 | Shiraogawa et al. | 364/200 |
| 4,319,225 | 3/1982 | Klose | 340/347 DD |
| 4,366,478 | 12/1982 | Masuda et al. | 340/825 |
| 4,376,933 | 3/1983 | Saran et al. | 340/347 DD |
| 4,417,303 | 11/1983 | Korowitz et al. | 364/200 |

Primary Examiner—Raulfe B. Zache
Assistant Examiner—A. E. Williams, Jr.
Attorney, Agent, or Firm—Antonelli, Terry & Wands

[57] ABSTRACT

An input/output control device stores variable-length data in a memory device at a high storage efficiency and without reducing the speed of data processing. The data stored in a memory are read out in the form of data of a fixed word length and then processed, the data having been processed are stored in another memory in the form of data of the fixed word length. The data stored in another memory are subjected to data organization to be outputted in the form of data of a given word length. Each of the memories is divided into a plurality of regions, and each region stores therein data of the same word length, respectively.

20 Claims, 19 Drawing Figures

| WL0 (5a) | WL1 (5b) | WORD LENGTH |
|---|---|---|
| 0 | 0 | 16-bit |
| 0 | 1 | 8-bit |
| 1 | 0 | 1-bit |
| 1 | 1 | |

INPUT/OUTPUT CONTROL DEVICE WITH MEMORY DEVICE FOR STORING VARIABLE-LENGTH DATA AND METHOD OF CONTROLLING THEREOF

This is a continuation of application Ser. No. 194,226 filed Oct. 6, 1980, now abandoned.

BACKGROUND OF THE INVENTION

The present invention relates to a memory device suitable for use in a data processing system which processes data of different word lengths, and more particularly to an input/output control device with a memory device for storing variable-length data and a method of controlling the input/output operations of the memory device.

A data processing system which processes data of different word lengths under computer control, includes, for example, a 1-bit processor (such as a sequencer) for conducting bit processing, a byte processor such as a general-purpose 8-bit microcomputer, a 16-bit processor such as a minicomputer, and a memory device for storing the data in these processors. The processors are connected through common data and address buses to each other and to the memory device. A given combination of the processors and the memory is employed in some cases. This is unavoidable since various processors with different bit configurations are now available on the market. Though the above-mentioned combination may be restricted in the future, there will still exist data processing systems which are made up of processors having different bit configurations.

In such data processing systems, the 1-bit processor, 8-bit processor and 16-bit processor are connected to the common data bus through a 1-bit bus, an 8-bit bus and a 16-bit bus respectively, when viewed from the standpoint of the word length of the data.

In such systems, there is a problem as to how the memory device for storing data of different word lengths is to be constructed and used to provide for the most efficient utilization of the available storage space. In order to solve the problem, two methods can be considered. According to the first method, the address space of the memory device is divided into three regions, namely, a region for 16-bit data, a region for 8-bit data and a region for 1-bit data. In such a method, the address space of the memory device cannot be effectively utilized, and the stored data has to be converted into data having a predetermined word length when subjected to any processing. In order to eliminate the above difficulties, most data processing systems employ a second method, according to which data of different word lengths is converted through the software processing into data having the same word length adapted for the memory device and then stored therein. In the second method, however, the overhead is increased due to the fact that the data conversion (namely, data organization) is effected through the software processing, and thus the processing performance or processing speed is degraded. The two methods, in brief, have the following drawbacks. In the first method, the memory device must store therein data of different word lengths leaving wasted address space, thereby decreasing the storage efficiency. While, in the second method, the processing performance (or processing speed) is degraded.

SUMMARY OF THE INVENTION

An object of the present invention is to provide an input/output control device with a memory device for storing variable-length data, which control device can store data of different word lengths in a memory device without leaving any wasted space therein, and a method of controlling the input/output control device including a memory device for storing variable-length data in which method data of different word lengths can be stored in the memory device without leaving any wasted space therein.

Another object of the present invention is to provide an input/output control device with a memory device for storing variable-length data, which control device can store data of different word lengths in a memory device without lowering the processing speed, and a method of controlling the input/output control device with a memory device for storing variable-length data in which method data of different word lengths can be stored in the memory device without lowering the processing speed.

A further object of the present invention is to provide an input/output control device with a memory device for storing variable-length data, which control device can read out the content of a memory in the unit of a fixed word length and output data of different word lengths, and a method of controlling the input/output control device with a memory device for storing variable-length data in which method the contents of a memory can be read out in the of a fixed word length and organized into data of a different word length.

Still another object of the present invention is to provide in a data processing system for processing data of variable word length an input/output control device including a memory device for storing variable-length data, which control device can store in the second memory data of a fixed word length formed through processing the data read out of a first memory, and can organize the contents of the second memory to form an output data of variable word length, and a method of controlling the word length of data in a data processing system for processing variable-length data, including a memory device which comprises a first and a second memory, in which method the data of a fixed word length read out of the first memory and subjected to processing is stored in the second memory, and the contents of the second memory are organized to form and output data of variable word length.

In order to attain these and other objects, a method of controlling the word length of data in a data processing system for processing variable-length data according to the present invention comprises the steps of storing data of variable word length in a first memory, reading out the stored data in the unit of a fixed word length, storing data of the fixed word length in a second memory, and organizing the stored data and outputting data of variable word length. In the former storing step, input data of variable word length is extended so as to have a predetermined word length determined by the bits of a column in a memory, and then part of the extended data is selected and stored in the memory at a specified address on the basis of a word length signal and an address signal. The stored data is read out of the memory in the unit of a fixed word length, and then processed. The data which has been subjected to the processing is stored in another memory at a specified address in the form of data having the fixed word length. The stored data is read out in accordance with the addressing based on a word length signal and an address signal to output data of variable word length.

Further, an input/output control device with a memory device storing variable-length data according to the present invention comprises a first memory device, means for storing data of variable word length in the first memory device, means for reading out the content of the first memory in the unit of a fixed word length, a second memory device, means for storing data of the fixed word length in the second memory device, and means for reading and organizing the content of the second memory device the output data of variable word length. In more detail, data having a short word length is extended in a data organizing means so as to have a word length determined by the bits of a column of the first memory device, and an appropriate part of the extended data is stored in the first memory device at a specified address with the aid of a strobe-signal generating means and an addressing means (for a writing operation). The stored contents are read out in the unit of a fixed word length in accordance with an address signal from a processor, and the data is then subjected to data processing. The data of a fixed word length is written in the second memory device in accordance with an address signal from the processor. The data having been stored in the second memory device can be read out in the form of data of variable word length with the aid of another data organizing means, a data-organization control means and an addressing means (for a reading operation). The first and second memories are preferably equal in storage capacity to each other. Further, it is desirable that data of different word lengths (in nature) is successively stored in corresponding regions in the memory.

DESCRIPTION OF THE PREFERRED EMBODIMENT

Figure 1:
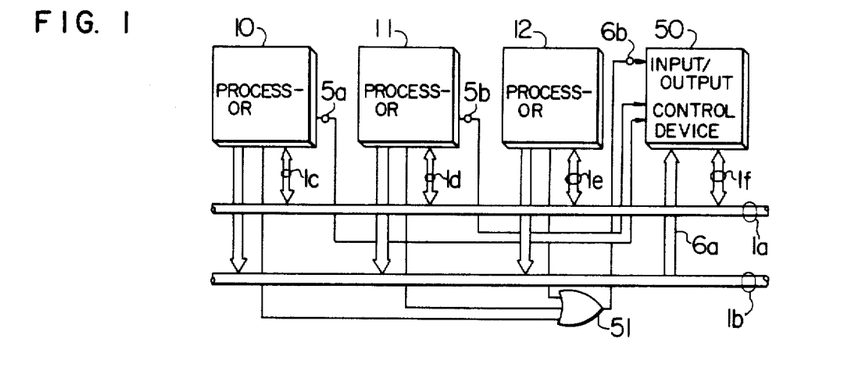
FIG. 1 shows a data processing system including an embodiment of an input/output control device according to the present invention.

In FIG. 1 showing a data processing system including an embodiment of an input/output control device according to the present invention, reference numeral 10 designates a 1-bit processor, 11 designates an 8-bit processor, 12 designates a 16-bit processor, 50 designates an input/output control device connected to an external unit, 1a designates a common data bus, 1b designates a common address bus, 1c designates a 1-bit bus for connecting the 1-bit processor 10 to the common data bus 1a, 1d designates an 8-bit bus for connecting the processor 11 to the bus 1a, 1e designates a 16-bit bus for connecting the processor 12 to the bus 1a, 1f designates a bus for connecting the input/output control device 50 to the bus 1a, 6a designates a bus for connecting the input/output control device 50 to the address bus 1b, 5a designates a signal line for indicating that 1-bit data is being sent to the bus 1a, and 5b designates a signal line for indicating that 8-bit data is being sent to the bus 1a. Further, strobe signals (each for controlling for writing operation) from the processors 10, 11 and 12 are applied to input terminals of an OR circuit 51, an output signal 6b of which is applied to input/output control device 50.

According to the present invention, data having different word lengths can be stored in a memory incorporated in the input/output control device 50 at a high storage efficiency, using the above-mentioned signals.

Figure 2:
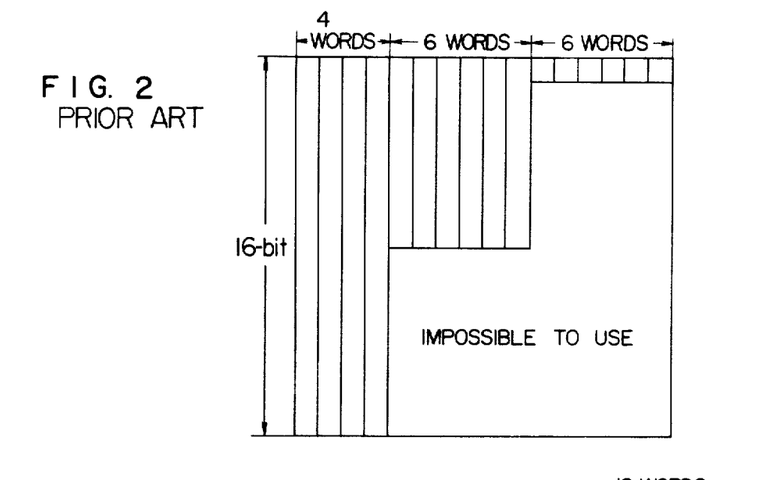
FIG. 2 shows an example of a conventional method of storing data in a memory.

FIG. 2 shows a case where data of different word lengths is stored in a memory in accordance with the prior art method. As shown in FIG. 2, the address space of the memory having a total bit capacity of 256 is divided into 16-bit, 8-bit and 1-bit regions, and further includes a space which cannot be used. In other words, the prior art memory device for storing data of different word lengths has no such components as the signal lines 5a, 5b and 6b and the OR circuit 51 shown in FIG. 1.

Figure 3:
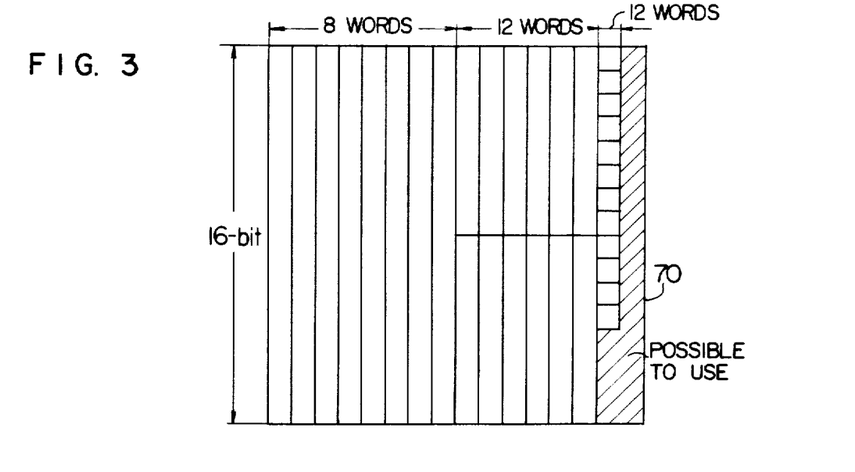
FIG. 3 shows an example of a method of storing data in a memory according to the present invention.

In a case where an input/ouput control device according to an embodiment of the present invention is employed, input data of different word lengths can be effectively stored in a 256-bit memory 70, as shown in FIG. 3. That is, the address space of the memory 70 is divided into regions in a desired manner in accordance with the kinds of the input data of different word lengths stored therein. FIG. 3 shows a case where the memory 70 is divided so as to include 8 words each having 16 bits, 12 words each having 8 bits, and 12 words each having one bit. As seen from FIG. 3, the entire space of the memory can be used.

Figure 4:
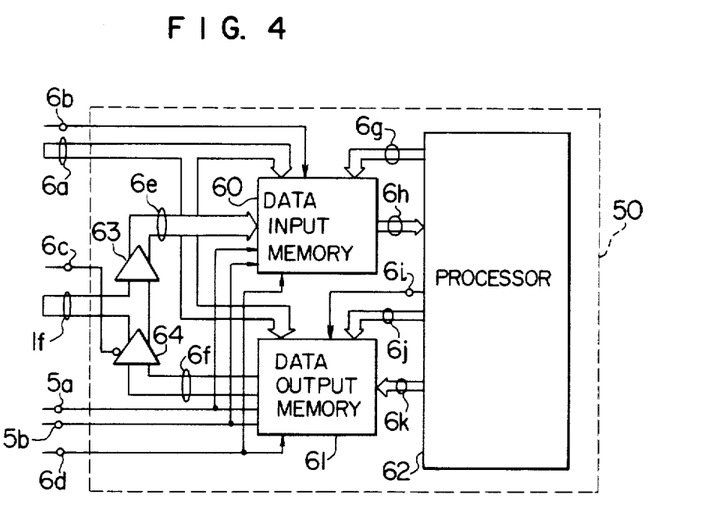
FIG. 4 shows an embodiment of an input/output control with a memory device for storing variable-length data according to the present invention.

FIG. 4 shows a circuit configuration of the input/output control device 50. Referring to FIG. 4, the input/output control device 50 includes a memory 60 for inputting data (hereinafter referred to as an input data memory), a memory 61 for outputting data (an output data memory), a data processor 62 for processing 8-bit data, in input driver 63 for driving input data, and an output driver 64 for driving output data. The function of the input/output control device 50 is fundamentally summarized in the following two items.

(i) The input data memory 60

Figure 6A:
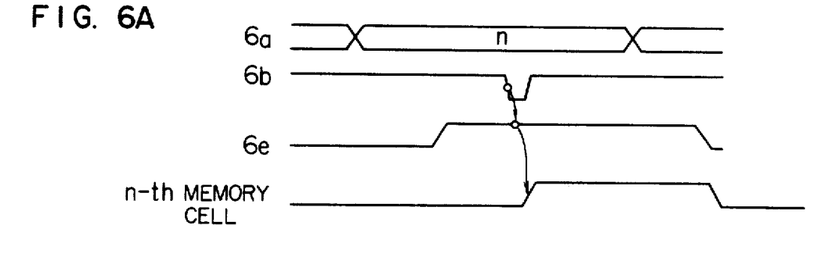
FIGS. 6A and 6B are time charts for explaining writing and reading operations in the input-data-memory shown in FIG. 5.
Figure 6B:
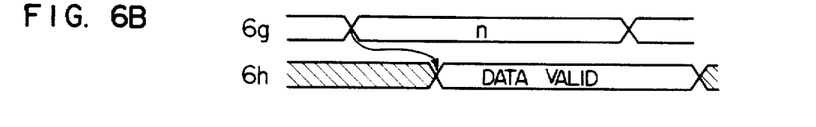

The data sent out from the processors 10, 11 and 12 is applied to the input/output control device 50 through the data buses 1a and 1f. The applied data is driven by the input driver 63, and then sent to the input data memory 60 to be stored therein. In the memory 60, the writing operation is performed in response to the strobe signal 6b, the size (or word length) of the data is indicated by the signals 5a and 5b, and the address is specified by the address signal on the bus 6a. The fact that the input/output control device 50 is selected, is indicated by a signal 6d. The explanation of the signal 6d is omitted since the signal 6d has no immediate connection with the present invention. The data stored in the memory 60 is selected in the form of data having a fixed word length (for example, 8-bit data) in accordance with an address signal 6g from the data processor 62, and thus 8-bit data 6h is read by the processor 62 to be subjected to data processing. The time charts of the writing and reading operations are shown in FIGS. 6A and 6B. That is, FIG. 6A shows the writing operation, and FIG. 6B the reading operation. Referring to FIG. 6A, a falling time of the strobe signal 6b is detected on the premise that the addressing has been made by the address signal on the address bus 6a, and the writing operation is performed in, for example, the n-th memory cell on the condition that the data bus 6e is kept in the on-state. Further, FIG. 6B shows the fact that the data at the n-th address is read in the processor 62 in accordance with an address signal 6g.

(ii) The output data memory 61

Figure 7A:
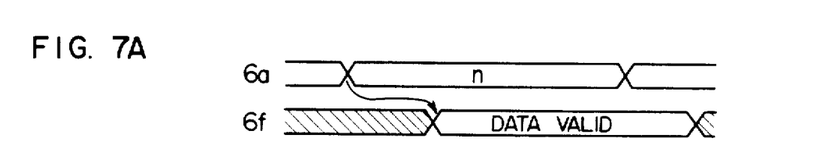
FIGS. 7A and 7B are time charts for explaining reading and writing operations in an output-data-memory of an input/output control device according to the present invention.
Figure 7B:
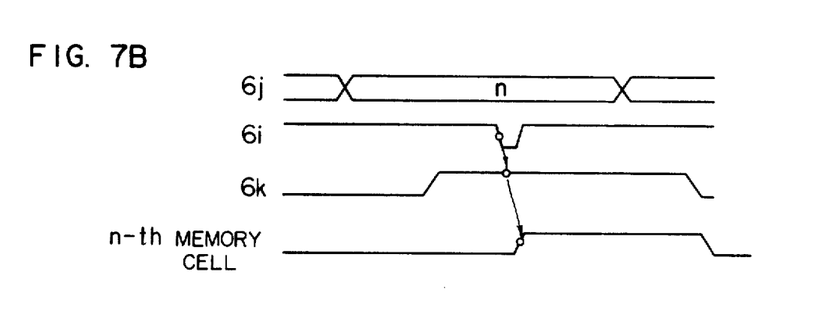

The data having been processed in the processor 62 is successively written through a bus 6k in those regions of the output data memory 61 which are specified by an address signal 6j, in accordance with a strobe signal 6i. The data having been stored in the memory 61 is read out on a bus 6f in accordance with the signals 5a and 5b and an address signal on the bus 6a, and then outputted to the data bus 1f through the output driver 64 which is made active by an output-data requiring signal 6c. The output data is sent to any one of the precessors 10, 11 and 12. FIGS. 7A and 7B are time charts for explaining the above-mentioned reading and writing operations which are equal respectively to those shown in FIGS. 6B and 6A.

In the above description, explanation has been made of the input/output control device 50 which receives data having arbitrary word lengths. Next, the input data memory 60 will be explained below in more detail by reference to FIGS. 5, and 8 to 12.

Figure 5:
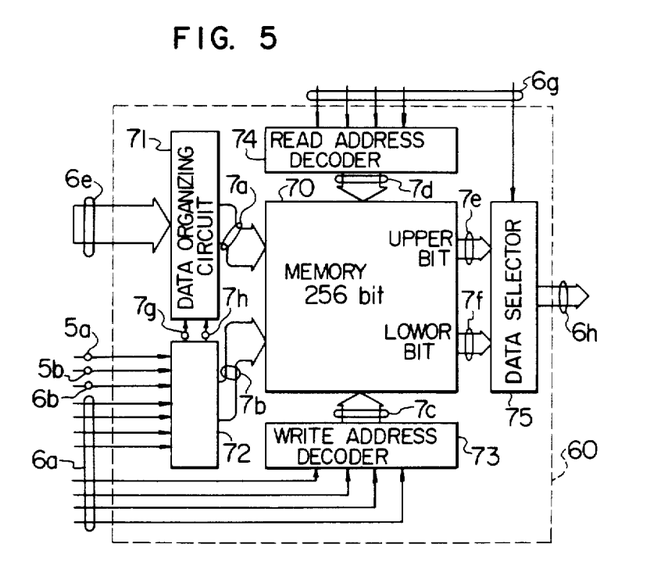
FIG. 5 is a block diagram showing a circuit configuration of an input-data-memory of an input/output control device according to the present invention.

Referring to FIG. 5, the input data memory 60 includes a 256 bit memory 70, a data organizing circuit 71 for organizing input data in accordance with their word lengths, a strobe signal generating circuit 72 for selectively generating a strobe signal at an interval of one bit, an address decoder 73 for the writing operation, an address decoder 74 for the reading operation, and a data selector 75.

Respective functions and operations of the above components 71 to 75 will be explained below.

(1) The memory 70

The total bit number of the memory 70 is equal to 256, and corresponds in size to 16 words each having a word length of 16 bits (namely, the greatest word length usable in the memory 70).

(2) The data organizing circuit 71

Figure 10:
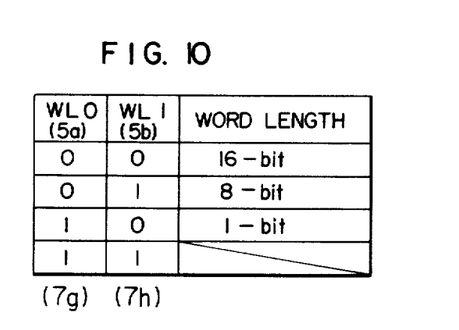
FIG. 10 shows patterns of word-length indicating signals.

The input data applied through the bus 6e to the circuit 71 is organized in one of the following three manners on the basis of the data-size indicating signals 7g and 7h (see FIG. 10).

Figure 9:
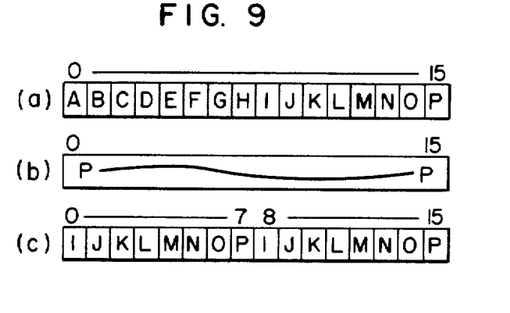
FIG. 9 shows the data layout of the output of the data organizing circuit shown in FIG. 8.

(A) 1-bit input data: a digit on the least significant bit of the bus 6e is or replicated so as to form 16-bit data, as seen in FIG. 9(b).

(B) 8-bit input data: a pattern on the lower byte of the bus 6e is extended so as to form 16-bit data having the same pattern in the upper and the lower bytes, as seen in FIG. 9(c).

(C) 16-bit input data: the data on the bus 6e is left as it is, as seen in FIG. 9(a).

The 16-bit data thus organized is applied to the memory 70 through a bus 7a.

(3) The strobe signal generating circuit 72

The circuit 72 receives the upper four bits of an address signal on the 8-bit address bus 6a, the strobe signal 6b and the data-size indicating signals 5a and 5b, and conducts the decoding operation to generate a strobe signal 7b which acts on each bit of a 16-bit word in the memory 70.

(4) The address decoder for the writing operation 73

The decoder 73 receives the lower four bits of an address signal on the bus 6a, and generates a write address signal 7c which specifies one of the word columns or directions in the memory 70, that is, specifies one of the addresses of the 16 words. The word directions are herein defined as the directions, in each of which 16 bits forming a 16 bit word are arranged as shown in FIG. 3.

(5) The address decoder for the reading operation 74

The decoder 74 receives the upper four bits of the address signal 6g from the data processor 62, and generates a read address signal 7d for reading out a 16-bit word (or data) which is stored in the memory 70 in a word direction.

(6) The data selector 75

Either one of the upper and lower bytes 7e and 7f of the 16-bit data which have been read out in accordance with the read address signal 7d from the address decoder 74, is selected on the basis of the least significant bit of the address signal 6g, to be used as the output data. That is, 8-bit data 6h is read out to the processor 62.

Next, various components making up the input data memory 60 will be explained below in detail.

Figure 8:
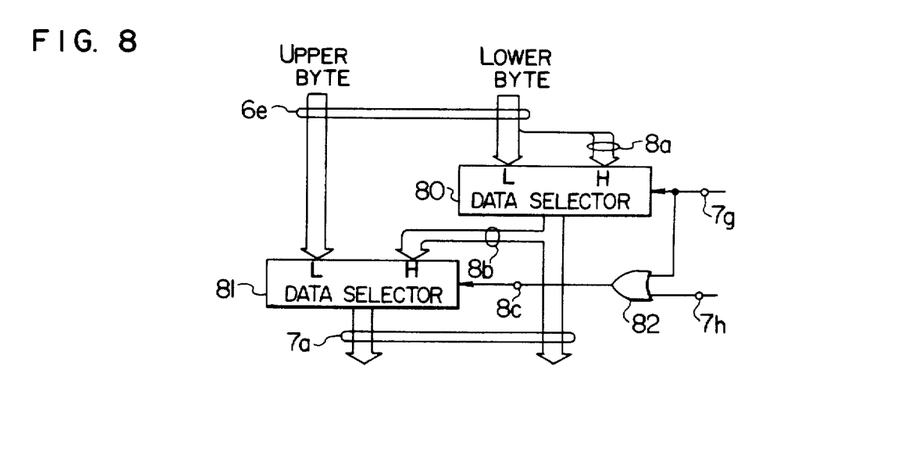
FIG. 8 shows a data organizing circuit incorporated in the input-data-memory shown in FIG. 5.

FIG. 8 shows a circuit configuration of the data organizing circuit 71, which includes data selectors 80 and 81 and a gate 82 for applying a selection signal to the data selector 81. The data selector 80 or 81 selects the input on the H(L) terminal when the control signal is "1" ("0"). Referring to FIG. 8, when the fact that the input data 6e is 1-bit data is indicated by the signals 7g and 7h, that is, when the signals 7g and 7h are kept in the level of "1" and the level of "0" respectively, a replicated 8-bit signal 8a which is obtained by extending the least significant bit of the input data 6e, is selected by the data selector 80. The signal 8a is selected in the data selector 80 as the lower eight bits of output data and is also applied to the data selector 81. The data selector 81 receives a selection signal 8c (or an output signal of the gate 82) which is equal in signal level ("4") to the signal 7g in this case. Accordingly, the signal 8b is selected in the data selector 81 as the upper eight bits of the output data by the data selector 81. Thus, 16-bit data 7a as shown in FIG. 9(b) is outputted.

In the above description, explanation has been made of a case where the least significant bit of the input data 6e is extended so as to form 16-bit data. Any one bit (other than the least significant bit) of the input data 6e can be also extended so as to form 16-bit data, by adding a bit selecting circuit (not shown) to the data organizing circuit 71 shown in FIG. 8.

When the fact that the input data 6e is 8-bit data is indicated by the signals 7h and 7g, that is, when the signals 7h and 7g are kept in the level of "1" and the level of "0" respectively, the lower eight bits of the input data 6e pass through the data selector 80 to form the lower eight bits of the output data 7a and 8-bit output data 8b. In this case, the selection signal 8c from the gate 82 is equal in signal level ("1") to the signal 7h. Thus, the 8-bit output data 8b which are identical with the lower eight bits of the output data 7a, are selected in the data selector 11 as the upper eight bits of the output data 7a.

Incidentally, it is easy to modify the circuit of FIG. 8 to extend the upper eight bits of the input data 6e into the lower eight bits so as to form 16-bit data. For example, the order of bits in FIG. 8 may be reversed so that the upper eight bits of the input data 6e are connected to an L-terminal of the data selector 80, and the lower eight bits are connected to an L-terminal of the data selector 81.

Finally, when the fact that the input data 6e is not 1-bit data nor 8-bit data is indicated by the signals 7g and 7h, the input data 6e is judged to be 16-bit data, and the data selectors 80 and 81 select the lower eight bits and the upper eight bits of the input data 6e, respectively.

FIG. 9 shows a pattern (a) of the input data 6e, a pattern (b) of the output data 7a obtained when the input data 6e is 1-bit data, and a pattern (c) of the output data 7a obtained when the input data 6e is 8-bit data. In a case when the input data 6e is 16-bit data, the pattern of the output data 7a is identical with the pattern (a).

Figure 11:
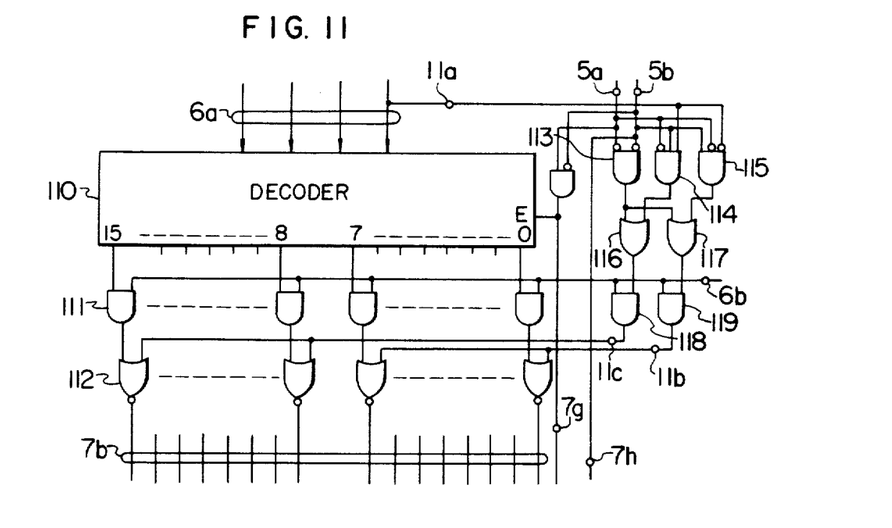
FIG. 11 shows a strobe-signal generating circuit incorporated in the input-data-memory.

Next, the strobe signal generating circuit 72 will be explained below in detail. FIG. 10 shows the relationship between the data-layout indicating signals 5a and 5b and the word length of the input data, and FIG. 11 shows the circuit configuration of the strobe signal generating circuit 72. Referring to FIG. 11, the circuit 72 includes a decoder 110, a gate group 111 for the strobe signal 6b, an OR gate group 112, and gates 113 to 117 for judging the size (or the word length) of data to control generation of the strobe signal 7b. When the input data is 1-bit, 8-bit, or 16-bit data, the strobe signal generating circuit 72 is operated in one of the following three manners.

Case I: where the input data is 1-bit data

One the 16 words in the memory 70 has been selected by the output signal 7c of the address decoder 73 which receives the lower four bits of an address signal on the 8-bit address bus 6a. The upper four bits of the address signal on the address bus 6a are applied to the decoder 110 to define which bit must be selected from the organized one word (16-bit), to be accessed. One gate of the gate group 111 is enabled in accordance with the defined bit, to allow the strobe signal 6b to pass therethrough. The strobe signal 6b thus outputted through the gate group 111 forms one bit of the strobe signal 7b through the OR gate group 112. The decoder 110 is made operative only in a case where the signals 5a and 5b take the level of "1" and "0" respectively, and is inoperative in other cases.

Case II: where the input data is 8-bit data

One of the 16 words in the memory 70 has been selected by the output signal 7c of the address decoder 73 which receives the lower four bits of an address signal on the 8-bit address bus 6a. The level "1" of the signal 5b indicates 8 bit data. The upper eight bits or the lower eight bits of the selected 16-bit word are accessed on the basis of a digit (or signal) 11a on the fifth bit (from the least significant bit) of the address signal on the bus 6a.

When the signals 11a and 5b take the level of "0" and the level of "1" respectively, a gate 119 is enabled by the output through the gates 115 and 117, and therefore the strobe signal 6b is allowed to pass through the gate 119 to form a signal 11b. The signal 11b (or the strobe signal 6b) is supplied to the lower eight bits of the signal 7b through the OR gate group 112, to set data at a desired lower byte position.

When both of the signals 11a and 5b take the level of "1", a gate 118 is enabled by the output through the gates 114 and 116, and therefore the strobe signal 6b is supplied in the form of a signal 11c to the upper eight bits of the signal 7b.

Case III: where the input data are 16-bit data

When both of the signals 5a and 5b take the level "0", the input data is judged to be 16-bit data. In this case, both of the gates 118 and 119 are enabled by the output of the gate 113 through the 116 and 117, and therefore the strobe signal 6b is supplied in the form of the signals 11c and 11b to all bits of the signal 7b.

Figure 12:
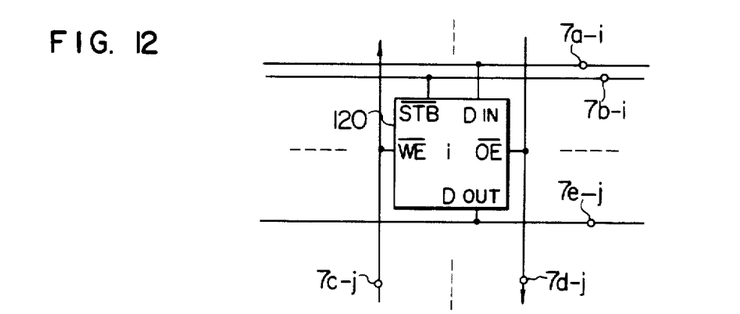
FIG. 12 shows electrical connections between various signals and a memory cell in the input-data-memory.

FIG. 12 shows electrical connections with respect to a 1-bit memory cell in the memory 70. Referring to FIG. 12, a memory cell 120 which corresponds to the i-th bit (of 16 bits) among the j-th word among 16 words, is connected to receive the input data from bus 7a–i, the strobe signal 7b–i, the write address signal 7c–j, the read address signal 7d–j, and the output of data bus 7e–j, in the manner illustrated. Such a 1-bit memory cell is arranged in large numbers so as to form the memory 70.

Next, explanation will be made on of the circuit arrangement for reading out that data of a fixed word length which has been processed in the processor 62, in the form of 1-bit, 8-bit, or 16-bit data through the output data memory 61, using FIGS. 13 to 17.

Figure 13:
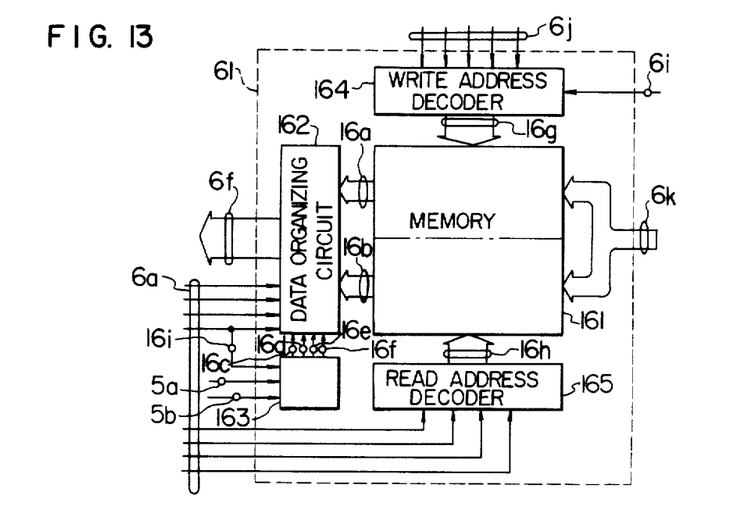
FIG. 13 is a block diagram showing a circuit configuration of an output-data-memory of an input/output control device according to the present invention.

Referring to FIG. 13, the output data memory 61 includes a memory 161, a data organizing circuit 162 for organizing output data in the form of data having a word length denoted by the signals 5a and 5b, a data-organization control circuit 163 for controlling the data organization in the circuit 162, an address decoder 164 for the writing operation, and an address decoder 165 for reading operation. Respective functions and operations of the components 161 to 165 will be explained below.

(1) The memory 161

The memory 161 is the same in construction as the memory 60.

(2) The data organizing circuit 162

The data of two bytes (or 16 bits) 16a and 16b, which is output from the memory 161, is supplied to the data organizing circuit 162, and is organized therein in the form of 1-bit, 8-bit, or 16-bit data in accordance with signals 16c, 16d, 16e and 16f from the data-organization control circuit 163. In more detail, the data organization is performed in one of the following three manners.

(A) 1-bit output data: the output data is expressed by the least significant bit of the bus 6f, and other bits thereof are put at the level "0".

(B) 8-bit output data: the output data is expressed by the lower byte of the bus 6f, and the upper byte thereof is put at the level "0".

(C) 16-bit output data: the output data is expressed by all bits (or 16 bits) of the bus 6f.

The output data (of 16 bits) thus organized is sent to the bus 1f through the output driver 64.

(3) The data-organization control circuit 163

The circuit 163 receives the word-length indicating signals 5a and 5b and a bit 16i (of an address signal on the address bus 6a) for indicating which of the bytes 16a and 16b carries desired 8-bit data, and forms a switch circuit for organizing either 1-bit, 8-bit or 16-bit data. The switch circuit will be explained later in detail.

(4) The address decoder for the writing operation 164

The decoder 164 receives the address signal 6j and the strobe signal 6i, each of which is delivered from the data processor 62, to generate a write address signal 16g for indicating any one of 32 bytes in the memory 161.

(5) The address decoder for the reading operation 165

The decoder 165 receives the lower four bits of the address signal on the 8-bit address bus 6a to generate a read address signal 16h for reading out two bytes (or 16 bits) in one word column in the memory 161.

Next, various components making up the output data memory 61 will be explained below in detail.

Figure 14:
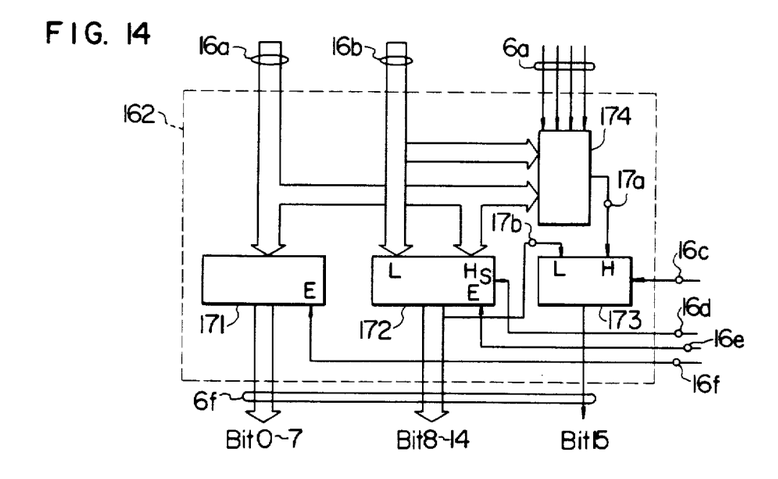
FIG. 14 shows a data organizing circuit employed in the output-data-memory.

FIG. 14 shows the circuit configuration of the data organizing circuit 162. Referring to FIG. 14, the circuit 162 includes a gate circuit 171 for the 1-byte data 16a read out of the memory 161, a data selector 172 for selecting either the 1-byte data 16a or the 1-byte data 16b, a bit selector 173 for selecting the least significant bit of the output data 6f, and a bit selector 174 for selecting one bit of 2-byte data. Now, let us consider a case where it is indicated that the output data 6f is 1-bit data. One bit of 2-byte data 16a and 16b is selected by the upper four bits of the address signal on the 8-bit address bus 6a. The signal on the selected bit is applied to the bit selector 173 in the form of a signal 17a. In this case, the signal 16c is kept at the level "1", and therefore the signal 17a is selected by the selector 173 and sent to the least significant bit of the output data 6f. Further, other bits of the output data 6f than the least significant bit take the level "0" since both of the signals 16e and 16f are kept at the level "0".

Next, let us consider a case where it is indicated that the output data 6f is 8-bit data. One of the 1-byte data 16a and the 1-byte data 16b is selected on the basis of the signal 16d to obtain the desired 8-bit data. When the data 16a is desired, the signal 16d is put at the level "1", and thereby the data 16a is selected by the data selector 172 and sent to the lower bits of the output data 6f. However, the least significant bit of the data 16a is applied to the bit selector 173 in the form of a signal 17b. The signal 17b is selected in the selector 173 by putting the signal 16c at the level "0". In this case, the signal 16f is kept at the level "0", and therefore the upper eight bits of the output data 6f take the level "0". When the data 16b is desired, the signal 16d is put at the level "0" to select the data 16b in the data selector 172.

Finally, let us consider a case where it is indicated that the output data 6f is 16-bit data. The gate circuit 171 is enabled by the signal 16f which is now put at the level "1", to send the data 16a to the upper eight bits of the output data 6f. Further, the signals 16d and 16e are kept at the level "0" and the level "1" respectively, to select the data 16b in the data selector 172. Furthermore, the signal 16c is kept at the level "0" to select the signal 17b in the bit selector 173.

Figure 15:
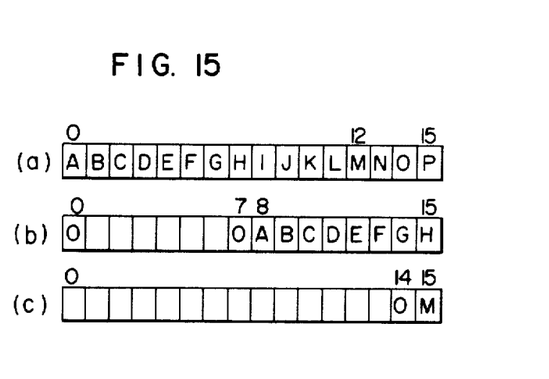
FIG. 15 shows the data layout of the output of the data organizing circuit shown in FIG. 14.

FIG. 15 shows various output data thus obtained. In FIG. 15, reference character (a) designates a pattern of 16-bit output data, (b) a pattern of 8-bit output data obtained when the 1-byte data 16a is selected (c) a pattern of 1-bit output data obtained when a bit (of bit number 12) of the 2-byte data 16a and 16b is selected.

Figure 16:
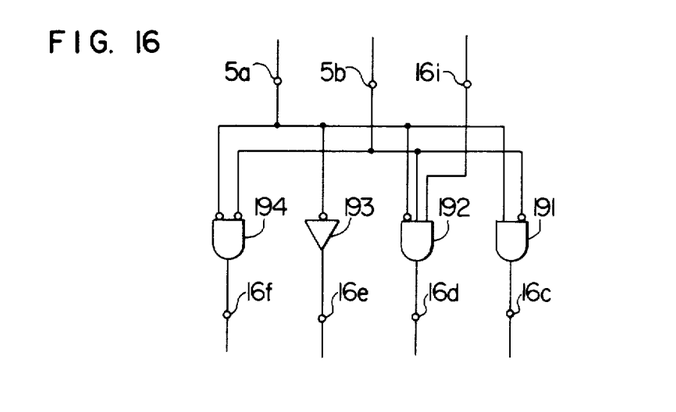
FIG. 16 shows a data-organization control circuit for controlling the data organizing circuit of the output-data-memory.

FIG. 16 shows the circuit configuration of the data-organization control circuit 163, which includes gates 191 to 194 to generate the control signals 16c, 16d, 16e and 16f. The signal 16c is put at the level "1" when the signals 5a and 5b inputted to the gate 191 are kept at the level "1" and the level "0", respectively, that is, when 1-bit data is to be outputted. The signal 16d is put at the level "1" when the signals 5a, 5b and 16i inputted to the gate 192 are kept at the level "0", the level "1" and the level "1", respectively, that is, when the 1-byte data 16a is to be outputted. The signal 16e is put at the level "1" when the signal 5a inputted to the gate 193 is kept at the level "0", namely, when 8-bit or 16-bit data is to be outputted. The signal 16f is put at the level "1" when both of the signals 5a and 5b inputted to the gate 194 are kept at the level "0", that is, when 16-bit data is to be outputted. As mentioned previously, the operation of the data organizing circuit 162 is controlled by these signals 16c, 16d, 16e and 16f.

Figure 17:
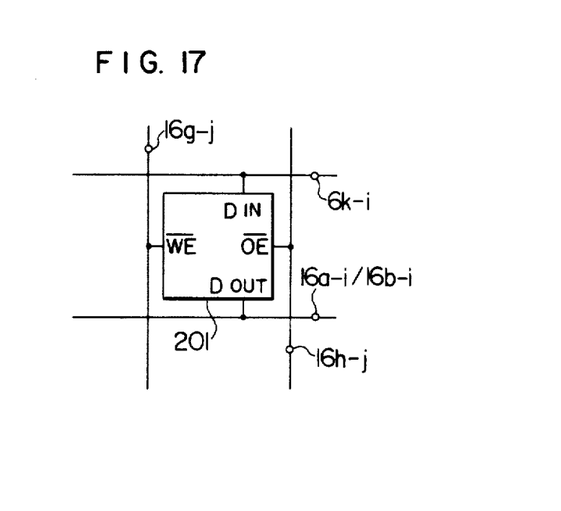
FIG. 17 shows electrical connections between various signals and a memory cell in the output-data-memory.

FIG. 17 shows the relation between various signals and a 1-bit memory cell 201 in the memory 161. The above-mentioned signals include one bit 6k-i of the data 6k outputted from the data processor 62, one bit 16g-j of the write address signal 16g from the address decoder 164, one bit 16h-j of the read address signal 16h which is obtained by decoding in the address decoder 165 a signal on the lower four bits of the 8-bit address bus 6a, and one bit 16a-i or 16b-i of one of the 1-byte data 16a and 16b which is read out on the basis of the read address signal 16h. The memory 161 is formed by arranging 16×16 memory cells, each of which has such a circuit connection as shown in FIG. 17.

We claim:

1. A method of controlling a data processing system for processing data having different word lengths at most equal to $2^N$ bits, where N is a positive integer, using a memory device which comprises a first and a second memory, the method comprising the steps of:

producing a first group of data words, in which first group at least one of the words is of different word length than the other words of the first group, each data word being at most equal to $2^N$ bits, producing a first signal indicating the word length $2^n$ of each data word of the first group, where n=0, 1, ..., (N−1) or N, and producing a second signal specifying an address in the first memory at which each data word is to be stored;

storing the data words of the first group in the first memory at the address specified by said second signal and in such a way that data words of the same word length as indicated by said first signal are successively stored with no unused storage space intervening between adjacent stored data words;

reading out the contents of said first memory as units of a fixed word length $2^m$, wherein m=0, 1 ... (N−1) or N;

producing a second group of data words, each second group having said fixed word length $2^m$;

storing the second group of data words in said second memory; and outputting the data words stored in said second memory in the form of data words of different word length from each other and having a length at most equal to $2^N$ bits.

2. A method according to claim 1, wherein said step of storing the first group of data words includes extending the word length of each data word having a word length shorter than $2^N$ bits by replicating the content thereof, on the basis of said first signal.

3. A method according to claim 2, wherein said step of storing the first group of data words further includes selecting part of the extended data word on the basis of said first and second signals and storing the selected part in the first memory on the basis of said second signals.

4. A method according to claim 1, further comprising the step of processing data words read out from the first memory in the unit of said fixed word length 2 m to generate said second group of data words of said fixed word length.

5. A method according to claim 1, further comprising the step of producing said second group of data words, associated with a third signal specifying an address in the second memory at which the data words of the second group is to be stored, wherein the step of storing the second group of data words includes storing each data word of the second group at an address specified by said third signal.

6. A method according to claim 1, wherein said outputting step includes the step of reading out the content of said second memory in the unit of a word length $2^N$.

7. A method according to claim 1, further comprising the step of producing a third signal indicating a word length and a fourth signal specifying location of a data word in the second memory, wherein said outputting step includes the step of reading out from the second memory data words having a word length identified by said third signal and having been stored in the second memory at an address specified by said fourth signal.

8. In a data processing system including data processing means for processing data of different word length at most equal to $2^N$ bits, where N is a positive integer, bus means connected to said data processing means for transmitting data, address and control signals, and an input/output control device connected to said bus means for controlling the transfer of data to and from said data processing means, said input/output control device comprising:

a memory device which includes a first and a second memory;

first means for receiving from said data processing means via said bus means a first group of data words in which at least one of the data words is of different word length from the other data words in the group, each data word being at most equal to $2^N$ bits, said first means also receiving a first signal indicating the word length $2^n$ of each data word of the first group, where n=0 1, ... (N−1) or N, and a second signal specifying an address in the first memory at which each data word is to be stored;

second means connected to said first means for storing the data words of the first group in the first memory at the address specified by said second signal and in such a way that data words of the same word length as indicated by said first signal are successively stored with no unused storage space intervening between adjacent data words;

third means connected to said first memory for reading out the content of said first memory as units of a fixed word length $2^m$, where m=0, 1, ..., (N−1) or N;

fourth means connected to said third means for processing data units of said fixed word length $2^m$ and generating a second group of data words each having a fixed word length $2^m$;

fifth means connected to said fourth means for storing the second group of data words in said second memory;

sixth means connected to receive from said data processing means via said bus means a third signal indicating a word length and a fourth signal specifying the location of a data word in the second memory; and seventh means connected to said sixth means and said second memory for organizing the data words stored in said second memory to form data words of variable word length at most equal to $2^N$ bits in response to said third and fourth signals and outputting the data words of variable word length to said bus means in response to said fourth signal.

9. An input/output control device according to claim 8, wherein said first memory is divided into a plurality of regions, and said second means includes means for storing within each of said regions data words of the same word length.

10. An input/output control device according to claim 8, wherein said second means includes further data organizing means for extending the word length of each data word having a word length shorter than $2^N$ bits by replicating the content thereof on the basis of said first signal.

11. An input/output control device according to claim 8, wherein said second means includes means for selecting part of the extended data word on the basis of said first and second signals and storing the selected part in the first memory on the basis of said second signals.

12. An input/output control device according to claim 8, wherein said first memory comprises a matrix memory of N rows by M columns, where M is a positive integer, and said third means for reading out the contents of said first memory includes read-address means for generating a read address signal specifying one of the columns and data selector means for reading out a $2^m$-bit part of the specified column.

13. An input/output control device according to claim 8, further comprising means connected to said fourth means for generating a write address signal for specifying an address in said second memory at which each data word of the second group is to be stored.

14. An input/output control device according to claim 8, wherein said organizing means includes means connected to said sixth means and said second memory for reading out from the second memory data words having a word length identified by said third signal and which have been stored in the second memory at an address specified by said fourth signal.

15. An input/output control device according to claim 14, wherein said second memory comprises a matrix memory of N rows by L columns, where L is a positive integer, and said seventh means includes read address means for identifying one of the columns on the basis of said fourth signal and organization control means for controlling organization of the content of the identified column to generate a data word of a word length identified by said third signal.

16. In a data processing system including data processing means for processing data of different word length at most equal to $2^N$ bits, where N is a positive integer, bus means connected to said data processing means for transmitting data, address and control signals, and an input/output control device connected to said bus means for controlling the transfer of data to and from said data processing means, said input/output control device comprising:

a memory device which includes a first and a second memory;

first means for receiving from said data processing means via said bus means a first group of data words in which at least one of the data words is of different word length from the other data words in the group, each data word being at most equal to $2^N$ bits, said first means also receiving a first signal indicating the word length $2^n$ of each data word of the first group, where $n = 0, 1, \ldots (N-1)$ or N, and a second signal specifying an address in the first memory at which each data word is to be stored;

said first memory having a plurality of data storage columns, each column having a first predetermined word length;

second means connected to said first means for organizing the data words of said first group on the basis of said first signal to form extended data words of said first predetermined word length;

third means connected to said first memory and said first means for selecting part of said extended data word of said first predetermined word length on the basis of said first and second signals and writing said part in said first memory on the basis of said second signal, so that data words of the first group having the same word length are successively stored with no unused storage space intervening between adjacent data;

fourth means connected to said first memory for reading out the contents of one of the data storage columns from said first memory;

fifth means connected to said fourth means for selecting part of the read-out data to generate data having a fixed word length $2^m$;

sixth means connected to said fifth means for processing said data of the fixed word length to generate a second group of data words having the fixed word length $2^m$;

said second memory having a plurality of data storage columns, each column having a second predetermined word length;

seventh means connected to sixth means for writing the second group of data words received from said sixth means in said second memory;

eighth means connected to receive from said data processing means via said bus means a third signal specifying the location of a data word in said second memory and a fourth signal indicating a word length;

ninth means connected to said second memory and said eighth means for reading out the contents of one of the plurality of data storage columns in said second memory on the basis of said third signal; and tenth means connected to said eighth means and ninth means for selecting part of the read-out contents on the basis of said third and fourth signals and outputting said selected data as data of different word length.

17. A method of controlling a data processing system for processing data having different word lengths at most equal to $2^N$ bits, where N is a positive integer, using a memory, the method comprising the steps of:

producing a group of data words, in which group at least one of the words is of different word length than the other data words in the group, each data word being at most equal to $2^N$ bits, a first signal indicating the word length $2^n$ of each data word of the group, where $n=0, 1, \ldots, (N-1)$ or N, and a second signal specifying an address in said memory at which each data word is to be stored;

storing the data words of the group in said memory at the address specified by said second signal and in such a way that data words of the same length as indicated by said first signal are successively stored with no unused storage space intervening between adjacent data words, including replicating each data word to form a $2^N$-bit data word based on the first signal when the word length $2^n$ of said each data word is less than $2^N$ and storing a selected $2^n$-bit part of the $2^N$-bit data word into the memory at the address specified by the first and second signals; and reading out the stored contents of said memory in units of a fixed word length $2^m$, where $m=0, 1, \ldots (N-1)$ or N.

18. In a data processing system including data processing means for processing data of different word length at most equal to $2^N$ bits, where N is a positive integer, bus means connected to said data processing means for transmitting data, address and control signals, and an input/output control device connected to said bus means for controlling the transfer of data to and from said data processing means, said input/output control device comprising:

a memory;

means for receiving from said data processing means via said bus means a group of data words at least one of which has a word length which is different from that of the other words in the group, each data word being most equal to $2^N$ bits, a first signal indicating the word length $2^n$ of each data word of the group where $n=0, 1, \ldots (N-1)$ or N, and a second signal specifying and address in the memory at which said each data word is to be stored;

means connected to said receiving means for storing the data words of the group in the memory at the address specified by the second signal and in such a way that data words of the same word length as indicated by said first signal are successively stored with no unused storage space intervening between adjacent data, including means for replicating each data word to form a $2^N$-bit data word based on said first signal when the word length $2^n$ of said each data word is less than $2^N$ and means for storing a selected $2^n$-bit part of the $2^N$-bit data word into the memory in accordance with said first and second signals and at the address specified by said second signal; and means connected to said memory for reading out the content of said memory in units of a fixed word length $2^m$, where $m=0, 1, \ldots, (N-1)$ or N.

* * * * *